United States Patent
Burger et al.

(10) Patent No.: US 8,201,024 B2
(45) Date of Patent: Jun. 12, 2012

(54) MANAGING MEMORY FAULTS

(75) Inventors: Doug Burger, Redmond, WA (US);
James Larus, Mercer Island, WA (US);
Karin Strauss, Seattle, WA (US);
Jeremy Condit, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/780,931

(22) Filed: May 17, 2010

(65) Prior Publication Data

US 2011/0283135 A1  Nov. 17, 2011

(51) Int. Cl.
*G06F 11/00* (2006.01)
(52) U.S. Cl. .......... 714/42; 714/6.1; 714/6.13; 711/206
(58) Field of Classification Search .............. 714/42, 714/6.1, 6.13; 711/206
See application file for complete search history.

(56) References Cited

U.S. PATENT DOCUMENTS

| | | | |
|---|---|---|---|
| 4,479,214 A | | 10/1984 | Ryan |
| 5,598,553 A * | 1/1997 | Richter et al. ............... 703/23 |
| 5,754,817 A * | 5/1998 | Wells et al. ............... 711/203 |
| 5,822,784 A * | 10/1998 | Garney ...................... 711/208 |
| 6,041,422 A | | 3/2000 | Deas |
| 6,112,286 A * | 8/2000 | Schimmel et al. .......... 711/208 |
| 6,477,612 B1 * | 11/2002 | Wang ........................ 711/2 |
| 6,581,142 B1 * | 6/2003 | Jacobs ...................... 711/159 |
| 7,221,604 B2 | | 5/2007 | Cheng et al. |
| 7,434,100 B2 * | 10/2008 | Hogdal et al. ............. 714/27 |
| 7,610,523 B1 | | 10/2009 | Singh |
| 7,653,778 B2 * | 1/2010 | Merry et al. .............. 711/103 |
| 2007/0226450 A1 * | 9/2007 | Engbersen et al. ......... 711/203 |
| 2008/0010483 A1 * | 1/2008 | Kuroishi et al. ............ 714/2 |
| 2008/0052015 A1 * | 2/2008 | Ozawa et al. .............. 702/57 |
| 2009/0013148 A1 * | 1/2009 | Eggleston ................. 711/203 |
| 2009/0161430 A1 * | 6/2009 | Allen et al. ............. 365/185.09 |
| 2009/0276659 A1 | 11/2009 | Suzuki |
| 2009/0287902 A1 * | 11/2009 | Fullerton et al. ........... 711/206 |
| 2009/0300290 A1 * | 12/2009 | Gollub et al. ............. 711/135 |
| 2009/0323417 A1 * | 12/2009 | Takada .................... 365/185.09 |
| 2009/0327833 A1 * | 12/2009 | Suto ........................ 714/752 |
| 2010/0037102 A1 | 2/2010 | Chen et al. |
| 2010/0100715 A1 * | 4/2010 | Gooding et al. ........... 712/227 |
| 2010/0223447 A1 * | 9/2010 | Serebrin ................... 712/225 |
| 2010/0251013 A1 * | 9/2010 | Yao et al. .................. 714/7 |
| 2010/0269000 A1 * | 10/2010 | Lee ........................ 714/718 |
| 2010/0281202 A1 * | 11/2010 | Abali et al. ............... 711/103 |
| 2010/0318845 A1 * | 12/2010 | Kohiga .................... 714/15 |

(Continued)

OTHER PUBLICATIONS

Jeremy., "Linux: Memory Error Handling", Retrieved at << http://kerneltrap.org/node/5293 >>, Jun. 16, 2005, pp. 16.

(Continued)

*Primary Examiner* — Scott Baderman
*Assistant Examiner* — Loan L.T. Truong

(57) ABSTRACT

Embodiments are described for managing memory faults. An example system can include a memory controller module to manage memory cells and report memory faults. An error buffer module can store memory fault information received from the memory controller. A notification module can be in communication with the error buffer module. The notification module may generate a notification of a memory fault in a memory access operation. A system software module can provide services and manage executing programs on a processor. In addition, the system software module can receive the notifications of the memory fault for the memory access operation. A notification handler may be activated by an interrupt when the notification of the memory fault in the memory access operation is received.

16 Claims, 3 Drawing Sheets

U.S. PATENT DOCUMENTS

| | | | |
|---|---|---|---|
| 2011/0055623 A1* | 3/2011 | Kim et al. | 714/5 |
| 2011/0060863 A1* | 3/2011 | Kimura et al. | 711/103 |
| 2011/0119538 A1* | 5/2011 | Ipek et al. | 714/719 |
| 2011/0145632 A1* | 6/2011 | Waldspurger et al. | 714/5.11 |
| 2011/0199845 A1* | 8/2011 | Yang et al. | 365/200 |
| 2011/0202709 A1* | 8/2011 | Rychlik | 711/103 |
| 2011/0209028 A1* | 8/2011 | Post et al. | 714/758 |
| 2011/0231713 A1* | 9/2011 | Takada et al. | 714/54 |

OTHER PUBLICATIONS

Singh, et al., "A Software Based Online Memory Test for Highly Available Systems", Retrieved at << http://ieeexplore.ieee.org/stamp/stamp.jsp?tp=&arnumber=1498158 >>, Proceedings of the 11th IEEE International On-Line Testing Symposium, Jul. 6-8, 2005 pp. 2.

* cited by examiner

MANAGING MEMORY FAULTS

BACKGROUND

Current and future off-the-shelf computing memory technologies are subject to memory cell failures that can prevent memory cells from reliably storing data. The failure of just a few memory cells can result in data loss and the decommissioning of a large region of memory. Examples of memory that may have a higher rate of memory cell failure than other types of memory include phase change memory and flash memory. However, the use of these types of memory is increasing due to a desire to replace the mechanical hard drives and volatile memory in many types of electronic products.

Memory hardware can hide memory cell failures from the software layers executing on the hardware by using some hardware correction techniques. Examples of hardware corrections include cell remapping where spare cells are used to replace faulty cells and error correcting code techniques where extra cells can store redundant information and use this redundant information to re-compute the original data in case of errors in a limited number of cells. However, once the memory hardware runs out of spare cells and/or the errors exceed ability to be corrected by the redundancy of error correcting codes, then the memory system has to decommission a large region of memory. These large regions of memory are typically a memory page of the memory hardware that can be in the range of approximately one kilobyte (1K) up to two megabytes (2 MB) in size. Decommissioning an entire memory page is inefficient because the majority of memory cells on the page still work, yet the whole page cannot be used after a memory page has been decommissioned.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various embodiments are described for managing memory faults. An example of a system can include a memory controller module to manage memory cells and report memory faults. An error buffer module can store memory fault information received from the memory controller. The error buffer can store information about data used in a write attempt, the size of the data being written, a physical location address where a write failure occurred, a write operation failure, and other relevant data. A notification module can be in communication with the error buffer module. The notification module may generate a notification of a memory fault in a memory access operation. A system software module can provide services and manage executing programs on a processing device or processor. In addition, the system software module can receive the notifications of the memory fault for the memory access operation. A notification handler may be activated by an interrupt when the notification of the memory fault in the memory access operation is received.

In an additional embodiment of the technology, a memory fault map can allow the system software module to record or add faulty memory regions to the memory fault map at a defined level of memory granularity. The memory fault map can provide a detailed database about which memory cells are available to be re-used in a memory page that contains a memory fault. A memory allocator for the system software module may be configured to access the memory fault map to avoid allocating faulty regions of memory.

DETAILED DESCRIPTION

Figure 1:
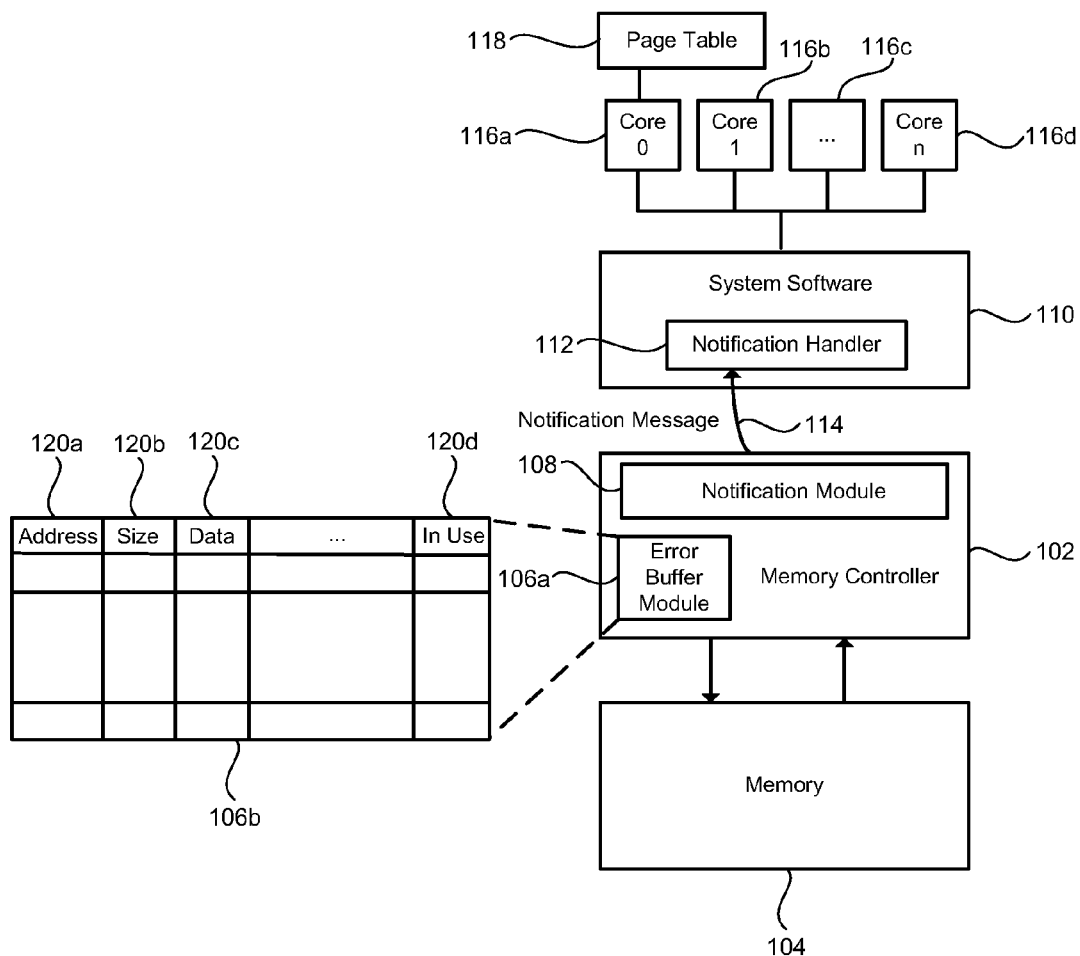
FIG. 1 is a block diagram illustrating an embodiment of a system for managing memory faults.

Reference will now be made to the exemplary embodiments illustrated in the drawings, and specific language will be used herein to describe the same. It will nevertheless be understood that no limitation of the scope of the technology is thereby intended. Alterations and further modifications of the features illustrated herein, and additional applications of the embodiments as illustrated herein, which would occur to one skilled in the relevant art and having possession of this disclosure, are to be considered within the scope of the description.

A technology is provided for a hardware and/or software interface that exposes memory faults and other memory error messages to system software. An example of system software is an operating system. This memory interface enables access to memory faults to enable the software to deal with hardware failures more flexibly than a hardware-centric solution or hardware correction alone. The technology includes modules and operations that the system software can activate to reclaim and use working memory cells that would otherwise be decommissioned because the working memory cells are in the vicinity of faulty cells.

A system is provided for managing memory faults. The system may include a memory controller module 102 or memory controller configured to manage memory cells and report memory faults. The term memory fault can include memory faults for individual memory cells, other memory faults, and/or messages generated by the memory. The memory cells can be located in a hardware memory module 104. The memory cells in the memory module may be a phase-change type of memory, flash memory, or another type of hardware memory module. The memory controller can be computer hardware that is located on a printed circuit board with the memory, the memory controller can be located on the same substrate with the memory, or the memory controller can be located on a chip substrate with the processors or processing cores. In one embodiment, the memory controller is embedded in firmware or in a FPGA (field programmable gate array). In another example configuration, the memory controller module may be an ASIC (application specific integrated chip) that is associated with the memory. In another instance, the memory controller module may be a firmware device driver associated with the memory and memory cells.

An error buffer module 106a can be configured to store memory fault information received from the memory module 104 by the memory controller 102. The error buffer module can include a storage buffer or another type of storage area that serves as temporary storage for information exchange about memory faults. The error buffer module can contain a table 106b to store memory errors and memory cell faults. The error buffer module can be configured to store information including: whether a write operation failed, the data used in a write attempt 120c, the size of the data that was being written 120b, an address of a physical location where a write failure occurred 120a, whether a memory address is currently in use 120d, and other relevant fault data. The memory controller module may use the contents of this table to manage read and/or write requests to locations that have suffered faults. This means information in the error buffer can be retrieved by the memory controller to communicate to the system software that a write operation has failed. The data used in the write attempt and which physical (and/or optionally virtual) location the hardware was attempting to write can be communicated to the system software. The error buffer module may mark in the storage buffer to indicate that a memory region with faults has been permanently decommissioned by the system software module. Thus, the system software can receive information from the memory controller about memory faults or to indicate that a memory region with faults is permanently decommissioned.

A notification module 108 can be in communication with the error buffer module and the memory controller. The notification module can be configured to generate a notification 114 of a fault or notification message for a memory access operation. In one example, the notification module can generate a memory fault interrupt for a read or write of a memory cell or memory region which failed or a memory region has been permanently decommissioned by the system software module. The fault interrupt may be a hardware fault interrupt that is received from the notification module. Alternatively, the fault interrupt may be a software interrupt, a software trap, hardware trap, or another kind of notification that the memory hardware sends to the system software or to a processor to redirect the execution to a handler that processes an event that needs attention. Examples of such events or interrupts may be the occurrence of a fault on a write operation or an interrupt representing that the amount of temporary storage used has reached a certain threshold such that faults can be processed in batch by the system software.

While some modules such as the notification module and the error buffer module are shown as being located inside other modules (e.g., the memory controller) these depictions are simply for illustrative purposes. The modules illustrated in the disclosure as being inside other modules may also be located independently or separately from other modules and simply be in communication with the related modules.

A system software module 110 can be configured to provide services and manage executing programs on a processing device or processor. The system software module can be configured to receive the notifications 114 of memory faults for the memory access operations. In some software architectures, the system software module can also include other run-time systems or run-time executables that can be considered part of the system software module or the run-time systems may interface with the system software module. In these cases, the interrupt can be delivered to a run-time system linked with an application rather than the operating system or the interrupt may be delivered to either the operating system or the run-time system which can notify other components in the system software module.

The system software module can be an operating system. Examples of such operating systems may include Microsoft Windows™, UNIX based operating systems, mobile phone operating systems, real-time operating systems, or other types of existing operating systems. In some embodiments, the system software may include a runtime executable environment or a virtual machine.

The system software can execute using one or more CPUs (central processing units) or processing cores 116a-d. These processing cores may also have a memory page table 118 for caching memory pages currently being accessed for the system software, the processes executing on the system software, or runtime executable environments (e.g. virtual machines) executing on the system software.

A notification handler 112 can be activated by an interrupt when the notification of the fault in the memory access operation is received. The notification handler can be an interrupt handler or device driver that can be activated to record memory faults for the system software after the memory faults happen and to manage the system software's ability to work around the failed memory cells. In one example, the system software may configure the notification handler in an interrupt table to be automatically looked up by hardware when a hardware interrupt is received. Alternatively, the system software may receive an interrupt and trigger the notification handler.

Figure 2:
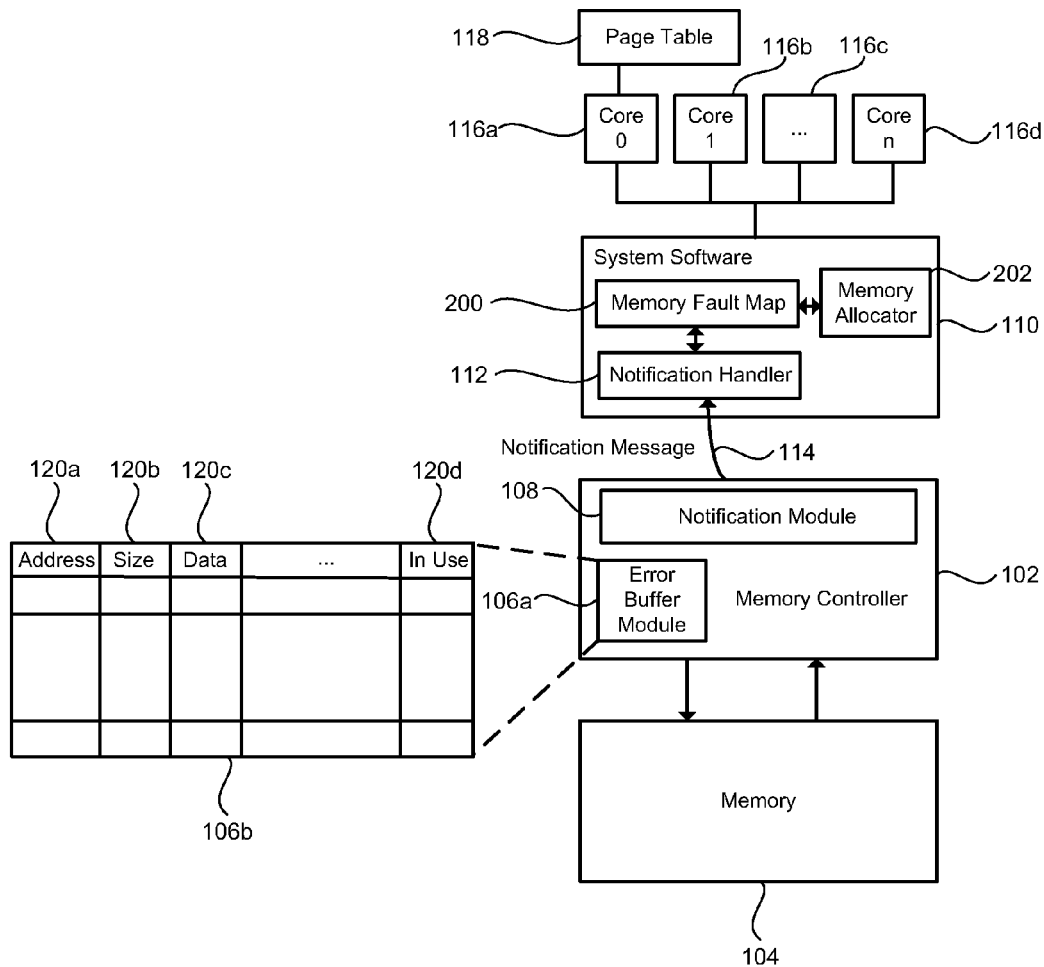
FIG. 2 is a block diagram of an embodiment of a system for managing memory faults with a memory fault map.

FIG. 2 illustrates another example of a system for managing physical memory faults. This system for managing physical memory includes many components similar to those components illustrated in FIG. 1, and like components in the figures have like numbers. Specifically, this system includes a hardware memory module 102 or memory controller configured to store information in memory cells 104 and report memory faults or memory cell faults. An error buffer 106a-b can store dynamic information about memory faults, memory cell faults, and memory cell decommissions received from the system software module.

The system can include a notification module 108 to generate notifications of faults for memory access operations and a system software module 110 with a notification handler 112 configured to be activated by an interrupt when a notification of a fault on the memory access operation is received.

An additional structure provided by the system in FIG. 2 is a memory fault map module 200 that can allow the system software module to record or add faulty memory regions in a memory fault map at a defined level of memory granularity. This memory fault map can later be used to avoid mistakenly trying to use or allocate faulty memory. The memory fault map can provide a detailed database for the system software module, and the memory fault map can identify which memory cells may be re-used in a memory region or memory page even though the memory region has a memory cell fault.

The memory fault map can track faults at arbitrary granularity. For example, the memory fault map can track memory cells at the byte, word, memory row, tenth of a memory page, or another defined level of granularity. However, a trade-off exists between the granularity of the memory fault map and the memory fault map's size. The finer the granularity of the memory fault map, the larger this memory fault map will be. In one embodiment, the memory fault map may contain multiple levels of granularity in one memory fault map, where different levels of granularity are tracked for different physical memory types. For instance, one granularity can be provided for SDRAM (synchronous dynamic random access memory) and a second granularity can be provided for phase change memory in the same memory fault map.

This memory fault map allows the system software to reclaim and re-use memory cells that would otherwise be decommissioned with a faulty memory page. Being able to reclaim working memory cells in proximity to or near to the non-working memory cells enables the memory to be used longer before an overall memory module fails and is not usable. In addition, reclaiming memory enables more of the working memory to be used even as individual memory cells begin to fail over time. Cell failure can be defined as complete failure of the cell at one time where the cell cannot be written to or read from or failure may be repeated intermittent failures during use over time.

Once the system software has a map of memory faults, the system software has detailed knowledge about which locations can or cannot be reused in a memory region that contains a fault. Since this map records faulty memory regions at defined levels' of granularity, working memory near or adjacent to the faulty region can still be used normally for data storage. The ability to reuse fine grain working memory regions as regular data storage despite nearby or adjacent faulty memory cells is a result of building a memory fault map at a fine granularity. As a result, a continuous virtual memory space can be provided using the memory fault map and a virtual to physical address translation table.

The use of the memory map configuration of FIG. 2 can also provide other results. Since the memory controller has limited storage for error reporting, the memory map can store a more complete map of the reported faults. On the other hand, the memory controller can cache details regarding more recent faults entries. The access to the memory controller's storage structures can be slow, since the access to a memory controller's control structures may be limited unless a processor is in supervisor mode. As a result, using a memory map that is more quickly accessible to the system software regardless of a processor's mode can make fault handling faster. In addition, the granularity at which a fault or error is reported from the memory controller may not be the same granularity as stored in the memory map. For instance, the software memory map granularity may be the same or coarser than the memory controller faults recorded.

A memory allocator 202 for the system software module may access the memory fault map to avoid allocating faulty regions of memory. By exposing memory faults to the memory allocator, the failed memory cells can be avoided when memory is allocated by the system software. For example, a sequential allocator that can allocate memory regions contiguously within a memory region can avoid allocating faulty regions by checking whether the memory fault map indicates any fault in the memory region the memory allocator intends to allocate on behalf of a requester (assuming the allocation is done for areas backed by physical memory). Using a memory fault map to avoid allocating data to faulty regions of memory means that requests for failed data cells can be avoided and memory allocation may be more efficient. The memory allocator may include a fractional mapping module to map whole virtual memory pages into partial physical memory pages with memory defaults.

System software may further expose memory fault information (maps and unwritten data due to a fault in a memory write) to higher level software. An example of software that can benefit from accessing the memory fault information can include software such as managed runtimes that handle their own memory management (i.e., memory allocation and garbage collection). Since no pointers are allowed in these managed runtimes, the managed runtimes have more flexibility on data placement in memory. On a memory fault, managed runtimes can copy the data to another working area of memory. In addition, managed runtimes can allocate memory around failures without the need of a continuous virtual address space. Regions of memory that are faulty can then be treated as special allocated objects that are not allocated for application data by the memory allocator, yet are not moved by a garbage collector process or module. If the memory space becomes fragmented by faults, the managed runtime can allocate small objects to small regions of working memory or break objects into smaller, hierarchically organized object segments. This is a software level solution to the pervasive memory fault problem.

Allowing the managed runtime environments to know about the memory faults can be valuable for modules such as virtual machines which may desire to allocate memory from the system software or main system's hardware memory. In addition, separate smaller managed runtimes can use the memory fault management technology for discrete tasks. For example, the managed runtimes may handle things like heap management, security, class loading, garbage collection, and memory allocation, which may free software developers to concentrate on the business logic specific of the high level software applications. When the managed runtimes are provided with memory fault information this allows the managed runtimes' memory management to seamlessly tolerate faults as the memory faults happen. In addition, the managed runtimes can reuse the working memory without the need of any support for a continuous virtual address space.

Figure 3:
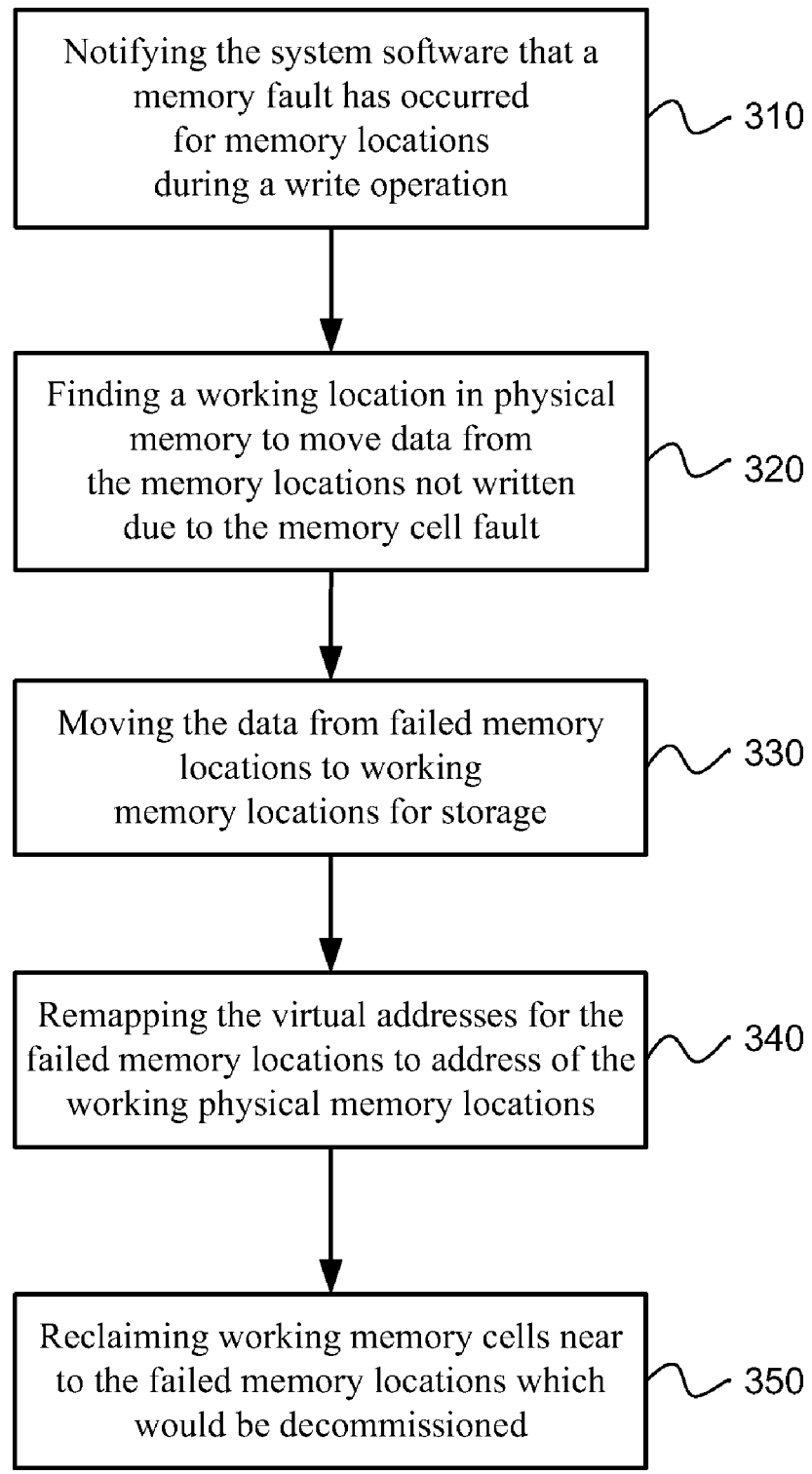
FIG. 3 is a flowchart illustrating an embodiment of a method for managing memory faults.

FIG. 3 illustrates a method for managing physical memory faults using system software. Specifically, FIG. 3 describes operations for the system software to handle one or more memory faults after the memory faults happen. The method can include the operation of notifying the system software that a memory fault has occurred for memory locations during a write operation, as in block 310. A working location in physical memory can then be found to enable the transfer of data from the memory locations not written due to the memory fault, as in block 320. In other words, once the system software is notified that a fault happened, the system software can find a working location in physical memory to move the data that was previously intended to be written when the fault happened. In some cases, some surrounding data (e.g. data in the same memory page) may also be moved to maintain data continuity.

The data from failed memory locations can then be transferred or moved to working memory locations for storage, as in block 330. The virtual addresses for the failed memory locations can then be remapped to addresses of the working physical memory locations, as in block 340. In other words, the virtual addresses are re-mapped to the selected working memory location(s). The present technology provides arbitrary granularity for the virtual to physical memory translations which can result in a continuous virtual addressing space in the presence of memory faults.

To remap virtual addresses to the memory cell locations, the virtual pages that map to the physical page being moved can be found, but this search for virtual pages may be a relatively expensive operation. This search operation can be implemented in a number of ways. For instance, the virtual pages that map to a physical memory page being moved can be identified. The system page tables can be scanned to find an address of the physical memory page to be moved. If the system page tables are scanned in search of the address of the physical page to be moved this can incur long latencies but there is no storage space overhead incurred. Alternatively, a reverse translation table of physical to virtual page addresses can be maintained in order to find the address of the physical page to be moved. While maintaining a reverse translation table incurs the overhead of table maintenance, this may result less apparent delay to the operating system and user than undertaking a scan of the system page tables but significant storage space overhead. Additional techniques such as a hash table can be used, or other summarization techniques may be used to identify virtual pages that need remapping (intermediate resource option). A further technique that can increase the efficiency of the re-mapping process can be to buffer memory faults and process the memory faults in batches to amortize the cost of searching for virtual pages to be remapped.

In one example configuration, the fault management interface may enable the hardware or memory controller to continue processing memory requests to failing memory locations for a limited period of time while the data being sent to the memory locations is being moved. The error buffer module that records faults can be capable of recording more than one failure simultaneously. As such, even if one write attempt to memory fails, other memory requests to other locations can continue to make progress. Eventually, if the recorded faults are not processed, the error buffer module can fill up. In this case, the system software may prevent any further write requests to memory until the data in the error buffer module has been processed or emptied.

The working memory cells near or adjacent to the failed memory locations which would otherwise be decommissioned can be reclaimed, as in block 350. Once the failed write data has been moved, the working memory cells can be marked as being available in a memory fault map to allow the system software module to find working memory cells at a defined level of memory granularity. Then later write operations can use these working memory cells. This enables the remaining working physical cells in a memory page to be used as opposed to being decommissioned. As described previously, the system software module may also use a memory allocator and a memory fault map to avoid allocating faulty regions of memory.

The effects of pervasive memory faults, as is anticipated to be common in phase-change memory, for example, are inconvenient because they fragment the memory's physical address space. In existing systems, the system software has to decommission the entire physical page where a fault has occurred to preserve virtual address continuity. In the example of the x86 architecture, the memory pages may be from 4 KB and 2 MB in size. So disabling a memory page can disable a significant area of memory. Once the hardware error correction mechanisms are exhausted, even if only one additional bit is faulty, the entire page may be marked as decommissioned or unavailable because a page is typically the minimum unit to maintain a continuous address space. This results in a waste of working memory. The finer granularity translations of the present technology enable system software to provide a continuous virtual memory space despite pervasive memory faults. Using memory fault maps associated with fine granularity virtual to physical address translation can provide a continuous virtual address space, even when memory faults fragment a physical memory space.

The operations described allow the system software to be involved in handling memory faults and to avoid the use of memory fault regions during execution. This management of memory faults is also provided at a finer granularity. In contrast, prior systems have performed memory tests at machine initialization time and disabled memory regions at a coarse granularity (at least a physical page at a time). This results in relatively large areas of memory becoming unusable in memory system types where memory cells regularly fail.

This technology provides an explicit interface for managing memory faults and the explicit interface communicates information about the memory faults to the system software or higher level application software. Previously, permanent memory fault information was either not exposed, exposed via error signals, exposed indirectly via parity bits to the system software. In addition, memory regions were not decommissioned at granularities finer than a page. This memory fault management interface enables software to directly identify regions with failures at a finer granularity than previously available and in a more direct manner. In addition, the memory fault management interface may enable hardware to continue processing requests to failing memory locations for a limited period of time while the data being sent to the memory locations is being moved.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology. Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A system for managing a hardware memory module, the system comprising:
    a memory controller configured to manage memory cells of the hardware memory module, the memory controller comprising:
        an error buffer module configured to store memory fault information received from the hardware memory module by the memory controller, the memory fault information reflecting a memory fault by an individual cell or memory region within a physical page of memory of the hardware memory module; and a notification module in communication with the error buffer module configured to generate a notification of the memory fault;

a system software module configured to provide services and manage executing programs on a processor, wherein the system software module is configured to receive the notification of the memory fault and re-use other memory cells or memory regions in the physical page of memory having the memory fault;

a notification handler configured to be activated by an interrupt when the notification of the memory fault is received; and a memory allocator configured to map a whole virtual memory page to partial physical memory pages having memory faults.

2. The system as in claim 1, wherein the error buffer module stores information including: whether a write operation failed, data used in a write attempt, and an address of a physical location where a write failure occurred.

3. The system as in claim 1, wherein the error buffer module is configured to mark in a storage buffer to indicate that individual memory regions with faults have been permanently decommissioned by the memory controller.

4. The system as in claim 1, wherein the notification module is configured to generate fault interrupts.

5. The system as in claim 4, wherein an individual fault interrupt is a hardware fault interrupt indicating that an individual memory region has been permanently decommissioned.

6. The system as in claim 1, wherein the notification module is configured to generate a fault interrupt indicating that an amount of temporary storage used has reached a certain threshold and a plurality of memory faults, including the memory fault by the individual cell or memory region, are available to be batch processed by the system software.

7. The system as in claim 1, wherein the memory cells are a non-volatile type of memory.

8. A method for managing physical memory faults using system software, the method comprising:

receiving, by the system software, a notification that a memory cell fault has occurred for a failed physical memory location of a physical memory, the memory cell fault occurring during a write operation to a physical memory page that includes the failed physical memory location;

finding a working physical memory location in the physical memory to move failed write data of the write operation;

moving the failed write data of the write operation to the working physical memory location of the physical memory for storage;

remapping a virtual address from the failed physical memory location having the memory cell fault to an address of the working physical memory location, the remapping comprising finding a plurality of virtual pages that map to the physical memory page that includes the failed physical memory location; and reclaiming working memory cells in the physical memory page having the failed physical memory location.

9. The method as in claim 8, wherein finding the plurality of virtual pages further comprises scanning system page tables.

10. The method as in claim 8, wherein finding the plurality of virtual pages further comprises maintaining a reverse translation table of physical to virtual page addresses.

11. The method as in claim 8, wherein reclaiming the working memory cells further comprises marking the working memory cells as being available in a memory fault map to allow the system software to find the working memory cells at a defined level of memory granularity.

12. The method as in claim 8, wherein the system software module uses a memory allocator and a memory fault map to avoid allocating the failed physical memory location.

13. A system comprising:

a memory fault map configured to:
   track faulty physical memory regions or faulty physical memory cells of a physical memory; and
   identify working physical memory cells in a physical memory page that includes one or more of the faulty physical memory regions or one or more of the faulty physical memory cells;

a system software module configured to reclaim the working physical memory cells from the physical memory page that includes the one or more faulty physical memory regions or the one or more faulty physical memory cells;

a fractional mapping module configured to map a whole virtual page into partial physical memory pages, the partial physical memory pages including the physical memory page that includes the one or more faulty physical memory regions or the one or more faulty physical memory cells; and one or more processors configured to execute the system software module.

14. The system according to claim 13, the whole virtual page being partially mapped to the working physical memory cells of the physical memory page and partially mapped to other working physical memory cells of another physical memory page.

15. The system according to claim 13, further comprising:
a notification module configured to provide a hardware interrupt fault to the system software module when a memory access operation attempts to access the one or more of the faulty physical memory regions or the one or more of the faulty physical memory cells in the physical page.

16. The system according to claim 15, the memory access operation comprising a write operation.

* * * * *